United States Patent
Zheng et al.

(10) Patent No.: US 6,216,166 B1
(45) Date of Patent: Apr. 10, 2001

(54) SHARED MEDIA COMMUNICATIONS IN A VIRTUAL CONNECTION NETWORK

(75) Inventors: Dan Zheng, Plano; George N. Frank, Irbing; Richard T. Hughey, Addison, all of TX (US)

(73) Assignee: ADC Telecommunications, Inc.

( * ) Notice: Subject to any disclaimer, the term of this patent is extended or adjusted under 35 U.S.C. 154(b) by 0 days.

(21) Appl. No.: 09/026,580

(22) Filed: Feb. 20, 1998

(51) Int. Cl.[7] .................................................. G06F 13/00
(52) U.S. Cl. ......................... 709/238; 709/236; 709/245; 709/246; 370/401
(58) Field of Search .................................. 709/223, 224, 709/225, 230, 231, 236, 237, 238, 245, 246; 370/395, 401, 466, 474

(56) References Cited

U.S. PATENT DOCUMENTS

| | | | |
|---|---|---|---|
| 4,677,611 | 6/1987 | Yamosy, Jr. et al. | 370/85 |
| 5,070,498 | 12/1991 | Kakuma et al. | 370/60 |
| 5,280,475 | 1/1994 | Yanagi et al. | 370/60 |
| 5,390,164 | 2/1995 | Kremer | 370/16.1 |
| 5,394,389 | 2/1995 | Kremer | 370/16.1 |
| 5,396,493 * | 3/1995 | Sugiyama | 370/403 |
| 5,515,363 | 5/1996 | Ben-Nun et al. | 370/17 |
| 5,537,411 | 7/1996 | Plas | 370/85.1 |
| 5,557,611 | 9/1996 | Cappellari et al. | 370/60.1 |
| 5,583,849 | 12/1996 | Ziemann et al. | 370/397 |
| 5,612,959 * | 3/1997 | Takase et al. | 370/390 |
| 5,636,215 | 6/1997 | Kubo et al. | 370/397 |
| 5,673,262 | 9/1997 | Shimizu | 370/395 |
| 5,684,800 * | 11/1997 | Dobbins et al. | 370/401 |
| 5,754,528 | 5/1998 | Uchida et al. | 370/222 |
| 5,774,662 * | 6/1998 | Sakagawa | 709/203 |
| 5,805,820 * | 9/1998 | Bellovin et al. | 709/225 |
| 5,838,663 | 11/1998 | Elwalid et al. | 370/233 |
| 5,852,606 * | 12/1998 | Prince et al. | 370/393 |
| 5,892,912 * | 4/1999 | Suzuki et al. | 709/218 |
| 5,912,891 * | 6/1999 | Kanai et al. | 709/218 |
| 5,978,356 | 11/1999 | Elwalid et al. | 370/230 |

OTHER PUBLICATIONS

"ATM Service Access Multiplexer (SAM) Generic Requirements", *GR–2842–Core*, Issue 2, (Nov. 1996).

"ATM Virtual Path Functionality in SONET Rings—Generic Criteria", *Bellcore Standard GR–2837–Core*, Issue 3, (Oct. 1996).

* cited by examiner

*Primary Examiner*—Viet D. Vu
(74) *Attorney, Agent, or Firm*—Fogg Slifer & Polglaze, P.A.

(57) ABSTRACT

A local area network (LAN) type group of data comprising a reserved value, a source media access control (MAC) address, and a destination MAC address. The source MAC address corresponds to a network element that originates the LAN type group of data. The destination MAC address uniquely corresponds to one or more network elements designated to receive the LAN type group of data.

36 Claims, 2 Drawing Sheets

SHARED MEDIA COMMUNICATIONS IN A VIRTUAL CONNECTION NETWORK

FIELD OF THE INVENTION

The present invention generally relates to data communications, and more specifically, to virtual connection networks.

BACKGROUND OF THE INVENTION

Virtual connection networks, such as Asynchronous Transfer Mode (ATM) networks, are becoming the preeminent means for facilitating wide bandwidth data transmission. Traditionally, ATM networks have been formed using edge switches which form a mesh for routing traffic through the network. Recently, Bellcore has proposed using ATM protocols in a ring network. Such an ATM network, for example, is formed by network elements (NEs), e.g. add drop multiplexers, coupled in a ring by transmission media, such as optical fiber.

User data is transmitted between two NEs in the following manner. Prior to transmitting data between two NEs, a virtual path is established between the two NEs. Upon formation of the virtual path, data is then transferred between the two NEs.

In addition to user data, it is necessary to transmit management data, for example from a management operations support, from one source NE to one or more destination NEs to control the ATM network. Conventional ATM transmission techniques are inefficient for management data transmission because the virtual path definition and data transfer must be repeated for each destination NE. Therefore, there is a need for a more efficient method of multicasting management data on a virtual connection network.

Another technique for managing an ATM network is to couple the NEs to one another with an Ethernet network in addition to the ATM network. The Ethernet network facilitates multicasting management data to NEs in a shared media format. Thus, a management data packet multicasted on the Ethernet network is shared with multiple NEs.

However, it is not practical to implement an Ethernet network with an ATM network. First, the Ethernet network can only connect nodes separated by maximum distances that are typically smaller than the distances between NEs. Also, the addition of a second network is costly. Therefore, there is a need for an alternative way of facilitating shared media communications in a virtual connection network.

SUMMARY OF THE INVENTION

The present invention solves the above-mentioned problems in the art and other problems which will be understood by those in the art upon reading and understanding the present specification. The present invention provides efficient shared media communications in a virtual connection network.

One embodiment of the present invention provides a local area network (LAN) type group of data, comprising a reserved value, a source media access control (MAC) address, and a destination MAC address. In another embodiment, the group of data further comprises management data. In yet another embodiment, the source MAC address corresponds to a network element that originates the LAN type group of data. In a further embodiment, the destination MAC address corresponds to a unique network element designated to receive the LAN type group of data. In yet a further embodiment, the destination MAC address corresponds to a plurality of network elements to which the LAN type group of data is multicasted.

Another embodiment of the present invention provides a virtual connection network comprising a plurality of network elements, and a policing network element that terminates an ATM cell with a corrupted MAC address. Transmission media couples the plurality of network elements and policing network element to one another.

A further embodiment of the present invention provides a method of operating a virtual connection network, comprising the step of disassembling a large group of data into LAN type groups of data including source and destination MAC addresses. The LAN type groups of data propagate from a first network element, to which the source MAC address corresponds, to a second network element to which the destination MAC address corresponds. The large group of data is reassembled from the LAN type groups of data in the second network element.

In another embodiment, the method further comprises the step of terminating the LAN type groups of data at the second network element. In yet a further embodiment, the method further comprises the step of terminating at least one of the LAN type groups of data at the first network element. In yet another embodiment, the method further comprises the step of terminating at least one of the LAN type groups of data at a policing network element.

Yet another embodiment of the present invention provides a method of automatically configuring a virtual connection network comprising the step of adding a new network element to the virtual connection network including a plurality of network elements. At least one group of LAN type data, containing the new network element's MAC address, is broadcast from the new network element to the plurality of network elements.

Yet a further embodiment of the present invention provides a method of obtaining the MAC address of a network element in a virtual connection network comprising the step of transmitting at least one group of data that forms an Internet Protocol (IP) packet and contains the IP address of a destination network element. At least one group of data is received at the destination network element. The MAC address is sent in at least one group of data from the destination NE to the source NE. A LAN type group of data, including a reserved value, is sent to the destination NE.

It is an advantage of the present invention that data such as management data can be efficiently transmitted to network elements in the virtual connection network. It is a further benefit of the present invention that the virtual connection network can automatically be reconfigured upon the addition of a new NE. It is a further advantage of the present invention that it can be used with protocols other than the IP.

DETAILED DESCRIPTION OF THE EMBODIMENTS

Figure 1:
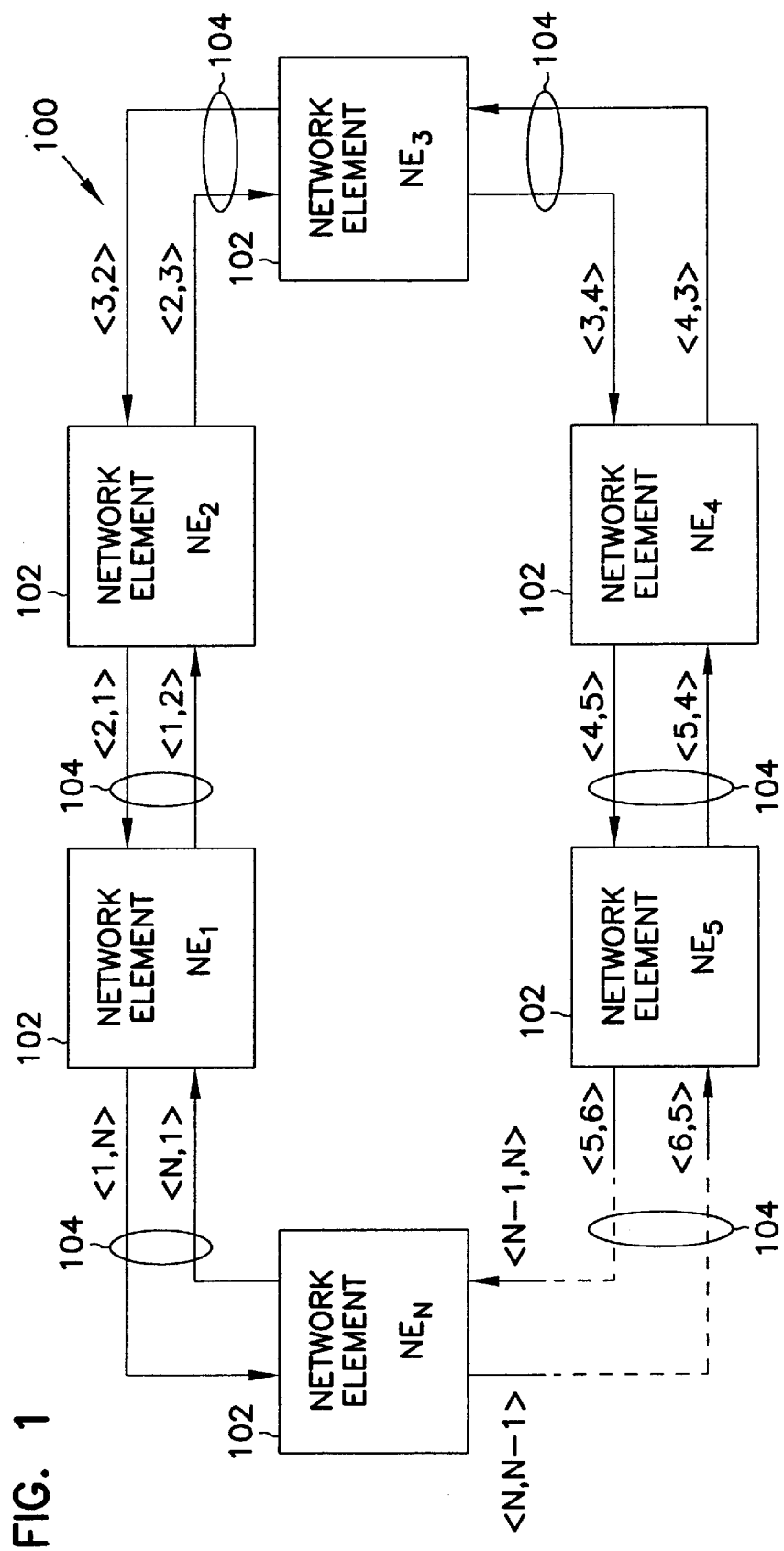
FIG. 1 illustrates one embodiment of an ATM network.

In the following detailed description of the preferred embodiments, reference is made to the accompanying drawings which form a part hereof and in which is shown by way of illustration specific embodiments in which the invention may be practiced. These embodiments are described in sufficient detail to enable persons skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention permits implementation of shared media communications in a virtual connection network. Local Area Network (LAN) type communications in a virtual connection network are simulated by assigning media access control (MAC) addresses to network elements (NEs). Thus, the efficient transfer of management data in the virtual connection network is facilitated.

The MAC addresses can be included in groups of data, such as cells, to identify the source and destination NEs of the groups of data. Groups of data incorporating MAC addresses are known as LAN type groups of data.

In one embodiment of the present invention, a unique media access control (MAC) address is assigned to each NE. To permit multicasting from one source NE to many destination NEs, reserved MAC addresses are assigned to unique groups of destination NEs. In one embodiment, the MAC addresses can be entered into the NEs with switches, such as dual inline pin switches. However, the MAC address can be entered into the NEs by alternative techniques, such as by electrical control signals, in a manner known by persons skilled in the art. The MAC addresses are utilized in the modified identifier as subsequently illustrated.

The modified identifier of a group of data contains (1) a reserved value in the VPI field, and (2) MAC addresses of source and destination NEs. The reserved value indicates to an NE that the group of data is a group of data having modified identifier with MAC addresses.

When a source NE originates a LAN type group of data, the source NE will incorporate its source MAC address, and the destination NE(s)'s MAC address into the modified identifier. The group of data propagates from the source NE through the virtual connection network. As the group of data encounters each subsequent NE in the virtual connection network, the NE analyzes the identifier to ascertain whether the group of data is a LAN type group of data by evaluating whether the group of data includes a reserved value. If the NE determines that the group of data is a LAN type group of data, then the NE further evaluates the destination MAC address to ascertain whether the NE is a designated destination NE. If the NE determines that it is a designated destination NE, then the NE copies the LAN type group of data. The source MAC address is used by such an NE to properly reassemble LAN type groups of data into a larger group of data, such as an Internet Protocol (IP) packet as described below, or by another NE to terminate the LAN type group of data as described below.

Subsequently, the NE terminates the LAN type group of data in the virtual connection network if the NE is the unique destination NE for the LAN type group of data. However, if for example, the source NE multicasts the LAN type group of data to multiple NEs in the virtual connection network, then the LAN type group of data must be terminated in another manner. If the LAN type group of data is not terminated, for example in an ring network, then the LAN type group of data will forever circle the ring network, reducing the network's bandwidth available for carrying other groups of data.

At least three methods for terminating the LAN type groups of data may be used. First, for example in a ring network, when a LAN type group of data returns to and is analyzed by its source NE, the source NE detects that it originated the LAN type group of data. Then, the source NE terminates the LAN type group of data in the virtual connection network.

This technique can also be used to terminate LAN type groups of data whose destination MAC address may have become corrupted. Such LAN type groups of data are not copied and terminated by their intended destination NE. Thus, such corrupted LAN type groups of data could perpetually circle the ring network, as described above.

Similarly, the source MAC address can become corrupted in a LAN type group of data. The technique described above would not terminate a multicasted LAN type group of data at its source NE. Therefore, two other methods are employed to ensure that all LAN type groups of data are eventually terminated.

First, one NE can be configured as a policing NE. The policing NE stores the MAC addresses of all NEs in the virtual connection network. The policing NE analyzes the source and destination MAC addresses of all LAN type groups of data which the policing NE encounters. The policing NE terminates any such LAN type groups of data that have either corrupted source or destination MAC addresses.

Second, the virtual connection network can periodically actuate, in the manner described below, to terminate all LAN type groups of data in the virtual connection network. Because a virtual connection network has a relatively low bit error rate, LAN type groups of data with corrupted MAC addresses rarely occur. Thus, the virtual connection network needs only to be actuated to terminate all LAN type groups of data approximately once every 24 hours or more. However, the virtual connection network can be reset more frequently. Actuation is effected, for example, by resetting the NEs for a period greater than the time taken for a LAN type group of data to propagate around the ring network. In one embodiment, the NEs are reset for approximately 500 milliseconds. However, in another embodiment, the NEs are reset for a time greater than approximately 50 milliseconds. Undesirably terminated LAN type groups of data, such as those that were not corrupted and had not reached their destination NE, would be retransmitted, for example pursuant to the error correction techniques in a manner known to persons skilled in the art.

Furthermore, in another embodiment of the present invention, LAN type groups of data are used only to transport management data. Therefore, when the previously described technique is used, only LAN type groups of data, and not groups of data containing user data, are terminated. This result may be attained by only resetting the portion of the NEs that affects LAN type groups of data. However, in another embodiment, the present invention may permit non-management data, such as user data, to be transported by LAN type groups of data.

The present invention facilitates multicasting, described above, which permits, for example, the following advantageous uses of virtual connection networks. In one embodiment of the present invention, the virtual connection network can be automatically be reconfigured upon the addition of a new NE to the virtual connection network. The new NE, after its addition to the virtual connection network, multicasts to all other NEs, i.e. broadcasts, at least one LAN type group of data notifying all other NEs of its existence and MAC address. Thus, a new NE can be quickly utilized in the virtual connection network. Further, an operator is not required to provide this information to the other NEs in the virtual connection network.

In another embodiment, the present invention can be used in a virtual connection network that is an asynchronous transfer mode (ATM) network. One embodiment of an ATM network 100, a ring, is illustrated in FIG. 1. The ATM network 100 includes NEs 102 and transmission media 104.

In yet another embodiment, a group of data is presented to an NE 102, for transmission in the ATM network 100, in an IP packet. The group of data, and thus the IP packet, may be of varying size.

However, data on the ATM ring is transmitted within ATM cells. ATM cells contain a fixed amount of data, for example 48 octets. Therefore, an IP packet, containing variable length data, must be disassembled into ATM cells, containing fixed length data, at a source NE to which the IP packet is presented. Then, the data in the ATM cells must be reassembled into an IP packet at a destination NE. Such disassembly and reassembly is performed by a protocol, such as ATM Adaption Layer Type 5 (AAL5). The AAL5 protocol includes a cyclic redundancy check (CRC). The AAL5 protocol is known to persons skilled in the art. In one embodiment, the present invention uses a modified AAL5 protocol that does not include the CRC because the IP already includes error checking. An ATM cell will now be described.

Figure 2:
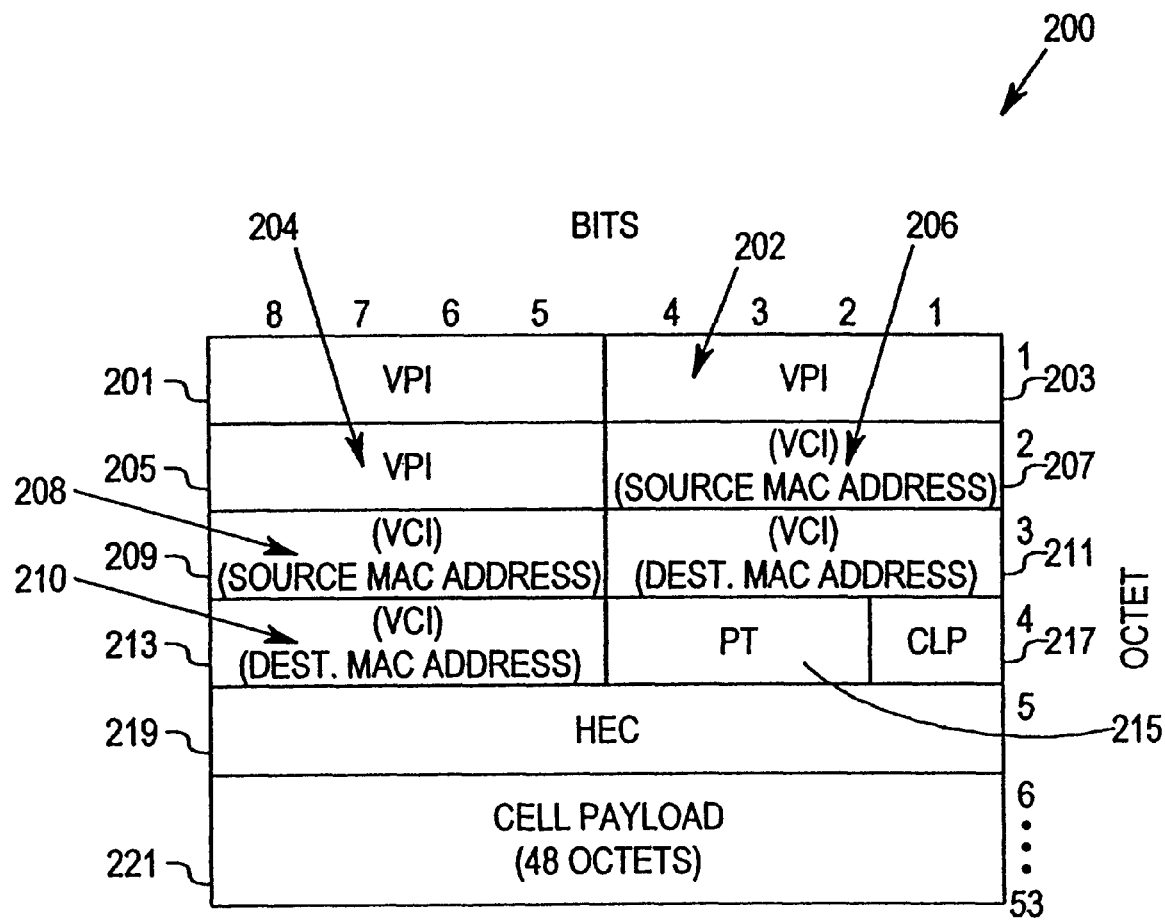
FIG. 2 illustrates an embodiment of an ATM cell.

FIG. 2 illustrates an ATM cell 200. The ATM cell 200 contains 53 octets. The ATM cell 200 includes three nibbles 201, 203, 205 that store a Virtual Path Identifier (VPI) 204. The three nibbles 201, 203, 205, are respectively the first and second nibbles of the first octet and the first nibble of the second octet. The ATM cell 200 further includes four nibbles 207, 209, 211, 213 in the second, third and fourth octets that stores a Virtual Channel Indicator (VCI) 206. The four nibbles 207, 209, 211, 213 are respectively the second nibble of the second octet, the first and second nibbles of the third octet, and the first nibble of the fourth octet. The VPI 204 and VCI 206 together form an identifier 202 that identifies the virtual connection between NEs 102 that includes the ATM cell 200.

The ATM cell 200 also includes bits for storing payload type 215, cell loss priority 217, and header error check 219 in the fourth and fifth octets. Finally, the ATM cell 200 includes a cell data payload 221, in which the fixed amount of data is stored, in the sixth through fifty-third octets.

One embodiment of the present invention is an ATM cell 200 having a modified identifier, described above, to achieve shared media communications. ATM cells 200 with modified identifiers are known as ATM-LAN cells.

The modified identifier 202 of an ATM-LAN cell contains (1) a reserved value of VPI 204, and (2) MAC addresses of source and destination NEs. The reserved value of VPI 204 indicates to an NE 102 that the ATM cell 200 is an ATM-LAN cell having a modified identifier with MAC addresses 208, 210.

The destination MAC address is stored into the last two nibbles 211, 213, or eight least significant bits, that might otherwise store a portion of the VCI 206. The source MAC address 208 corresponds to the source NE, and is stored in the first two nibbles 207, 209, or eight most significant bits, that might otherwise store another portion of the VCI 206.

In another embodiment of the present invention, a source NE can ascertain the MAC address of a destination NE whose IP, but not MAC, address is known. The source NE broadcasts at least one ATM cell 200 forming an IP packet and containing the IP address of the destination NE using a protocol, like an address resolution protocol. Upon receiving the ATM-LAN cells, the destination NE sends its MAC address in at least one ATM cell 200 to the source NE. Then, the source NE sends data in ATM-LAN cells to the destination NE.

Conclusion

The present invention permits implementation of shared media communications in a virtual connection network, such as an ATM network 100. It is an advantage of the present invention that data such as management data can be efficiently multicasted to NEs 102 in the virtual connection network. It is a further benefit of the present invention that the virtual connection network can automatically be reconfigured upon the addition of a new NE.

It is understood that the above description is intended to be illustrative, and not restrictive. For example, the present invention can be implemented with groups of data having formats different from the illustrated ATM cell or the Internet Protocol. Thus, the virtual connection network can be a network other than an ATM network. Furthermore, the present invention can be implemented with other assembly and disassembly protocols. Many embodiments will be apparent to those skilled in the art upon reviewing the above description.

What is claimed is:

1. A local area network (LAN) type group of data, comprising:

a reserved value that indicates a virtual connection to be used for communicating data to network elements for use by the network elements, wherein the network elements provide at least one of switching and transport functions;

a source media access control (MAC) address of a source network element;

a destination MAC address of a destination network element; and payload data.

2. The LAN type group of data of claim 1, wherein payload data comprises management data.

3. The LAN type group of data of claim 1, wherein the source MAC address corresponds to a network element that originates the LAN type group of data.

4. The LAN type group of data of claim 1, wherein the destination MAC address corresponds to a unique network element designated to receive the LAN type group of data.

5. The group of data of claim 1, wherein the destination MAC address corresponds to a plurality of network elements to which the LAN type group of data is multicasted.

6. An local area network (LAN) type group of data, comprising:

a reserved value that indicates a virtual connection to be used for LAN type communications among network elements that provide at least one of switching and transport functions;

a source media access control (MAC) address;

a destination MAC address;

payload data; and wherein the LAN type group of data is an asynchronous transfer mode (ATM) cell, and the source and destination MAC addresses are stored in nibbles designated for use by a virtual channel indicator.

7. An Asynchronous Transfer Mode (ATM) cell, comprising:

a first octet including first and second nibbles respectively containing first and second portions of a reserved virtual path indicator;

a second octet including third and fourth nibbles, wherein the third nibble contains a third portion of the reserved virtual path indicator, and the fourth nibble contains a first portion of a source media access control (MAC) address;

a third octet including fifth and sixth nibbles, wherein the fifth nibble contains a second portion of a source MAC address, and the sixth nibble contains a first portion of a destination MAC address;

a fourth octet including a seventh nibble containing a second portion of a destination MAC address; and forty eight octets containing a cell payload.

8. The ATM cell of claim 7, wherein the cell payload contains management data.

9. The ATM cell of claim 7, wherein the source MAC address corresponds to a network element that originates the ATM cell.

10. The ATM cell of claim 7, wherein the destination MAC address corresponds to a unique network element that is designated to receive the ATM cell.

11. The ATM cell of claim 7, wherein the destination MAC address corresponds to a plurality of network elements to which the ATM cell is multicasted.

12. A virtual connection network, comprising;

a plurality of network elements that each provide at least one of switching and transport functions;

a policing network element that terminates a local area network (LAN) type group of data with a corrupted media access address of one of the plurality of network elements; and transmission media coupling the plurality of network elements and policing network element to one another.

13. A method of operating a virtual connection network, comprising:

disassembling a large group of data into local area network (LAN) type groups of data including source and destination media access control (MAC) addresses and reserved identifiers for communicating data to network elements for use by the network elements, wherein the network elements provide at least one of switching and transport functions;

propagating the LAN type groups of data from a first network element of the source MAC address, to a second network element of the destination MAC address; and reassembling the large group of data from the LAN type groups of data in the second network element.

14. The method of claim 13, wherein disassembling and reassembling a large group of data are performed on a large group of data that includes management data.

15. The method of claim 13, wherein disassembling a large group of data includes the step of disassembly, of a large group of data that is an Internet Protocol packet, with a modified ATM adaption type layer 5 protocol.

16. The method of claim 13, wherein reassembling the large group of data includes reassembling a large group of data that is an Internet Protocol packet, with a modified ATM adaption type layer 5 protocol.

17. The method of claim 13, further comprising terminating the LAN type groups of data at the second network element.

18. The method of claim 13, further comprising terminating at least one of the LAN type groups of data at the first network element.

19. The method of claim 13, further comprising terminating at least one of the LAN type groups of data at a policing network element.

20. The method of claim 13, further comprising resetting the network elements for a period greater than approximately 500 milliseconds to terminate all LAN type groups of data.

21. The method of claim 20, wherein resetting the network elements comprises resetting the network elements for a period greater than approximately 50 milliseconds to terminate all LAN type groups of data.

22. A method of automatically configuring a virtual connection network, comprising:

adding a new network element to the virtual connection network including a plurality of network elements and wherein the network elements each provide at least one of switching and transport functions; and broadcasting at least one local area network (LAN) type group of data, containing the new network element's media access control (MAC) address, from the new network element to the plurality of network elements.

23. A method of obtaining the media access control (MAC) address of a network element (NE) that provides at least one of switching and transport functions in a virtual connection network, comprising:

broadcasting at least one group of data that forms an Internet Protocol (IP) packet and contains the IP address of a destination NE;

receiving the at least one group of data at the destination NE;

sending the MAC address in at least one group of data from the destination NE to the source NE; and sending data in local area network (LAN) type groups of data to the destination NE.

24. The method of claim 23, wherein the step of broadcasting uses an address resolution protocol.

25. A method for managing a virtual connection network, the method comprising:

generating management data for at least one network element of the virtual connection network, wherein the network elements each provide at least one of switching and transport functions;

generating at least one packet containing the management data and an identifier that identifies a virtual connection for communicating the management data to the at least one network element;

transmitting the at least one packet to the at least one network element over the virtual connection network; and terminating the packet at the at Least one network element.

26. The method of claim 25, wherein generating at least one packet comprises generating at least one packet for a single network element.

27. The method of claim 25, wherein generating at least one packet comprises generating at least one packet for multicasting to at least two network elements.

28. The method of claim 25, wherein transmitting the at least one packet comprises, at each network element that processes the at least one packet:

determining whether the packet contains management data; and when the packet contains management data and a media access control (MAC) address corresponds to the network element, copying and forwarding the packet.

29. The method of claim 25, wherein generating at least one packet comprises generating a plurality of packets.

30. The method of claim 29, and further comprising:

receiving the plurality of packets at the at least one network element;

combining the management data from the plurality of packets based on a source MAC address.

31. A virtual connection network, comprising:

a plurality of network elements coupled to form a ring, wherein the plurality of network elements each provide at least one of switching and transport functions;

wherein each network element includes a media access (MAC) address; and a virtual connection dedicated to transmitting packets including management data to the network elements, for use by the network elements, based on the MAC addresses of each of the network elements.

32. The virtual connection network of claim 31, wherein at least two of the network elements include a common MAC address to allow multicasting of data to the at least two network elements.

33. The LAN type group of data of claim 6, wherein the payload data comprises management data.

34. The LAN type group of data of claim 6, wherein the source MAC address corresponds to a network element that originates the LAN type group of data.

35. The LAN type group of data of claim 6, wherein the destination MAC address corresponds to a unique network element designated to receive the LAN type group of data.

36. The LAN type group of data of claim 6, wherein the destination MAC address corresponds to a plurality of network elements to which the LAN type group of data in multicasted.

* * * * *